(12) United States Patent
Velev (10) Patent No.: US 7,547,380 B2
(45) Date of Patent: Jun. 16, 2009

(54) DROPLET TRANSPORTATION DEVICES AND METHODS HAVING A FLUID SURFACE

(75) Inventor: Orlin Velev, Cary, NC (US)

(73) Assignee: North Carolina State University, Raleigh, NC (US)

( * ) Notice: Subject to any disclaimer, the term of this patent is extended or adjusted under 35 U.S.C. 154(b) by 699 days.

(21) Appl. No.: 10/755,843

(22) Filed: Jan. 12, 2004

(65) Prior Publication Data

US 2004/0211659 A1 Oct. 28, 2004

Related U.S. Application Data (60) Provisional application No. 60/439,624, filed on Jan. 13, 2003.

(51) Int. Cl.
*G01N 27/26* (2006.01)
(52) U.S. Cl. .................................. 204/547; 204/643
(58) Field of Classification Search ................ 204/547, 204/643, 554, 660, 164
See application file for complete search history.

(56) References Cited

U.S. PATENT DOCUMENTS

| | | | | |
|---|---|---|---|---|
| 4,390,403 | A | * | 6/1983 | Batchelder ................. 204/547 |
| 6,056,861 | A | * | 5/2000 | Fuhr et al. ................. 204/547 |
| 6,149,789 | A | * | 11/2000 | Benecke et al. ............. 204/547 |
| 6,294,063 | B1 | * | 9/2001 | Becker et al. ............... 204/450 |
| 6,565,727 | B1 | | 5/2003 | Shenderov ................... 204/600 |
| 6,749,736 | B1 | * | 6/2004 | Fuhr et al. ................... 204/643 |
| 6,911,132 | B2 | * | 6/2005 | Pamula et al. ............... 204/600 |
| 7,147,763 | B2 | * | 12/2006 | Elrod et al. .................. 204/547 |
| 2003/0170698 | A1 | * | 9/2003 | Gascoyne et al. ............. 435/6 |

OTHER PUBLICATIONS

Cho et al., "Towards digital microfluidic circuits: creating, transporting, cutting and merging liquid droplets by electrowetting-based actuation," *Mechanical and Aerospace Engineering Department*, University of California, Los Angeles (UCLA) pp. 32-35 (2002).

Song, Helen et al., A Microfluidic System for Controlling Reaction Networks in Time: Communications, *Angew. Chem. Int. Ed.* 42, 7 767-772 (2003).

Jones et al., "Dielectrophoretic liquid actuation and nanodroplet formation," *Journal of Applied Physics*, 89:3 1-8 (2001).

Jones, T.B., "Liquid dielectrophoresis on the microscale," *Journal of Electrostatics* 51 }52 290-299 (2001).

(Continued)

*Primary Examiner*—Kaj K Olsen
(74) *Attorney, Agent, or Firm*—Myers Bigel Sibley & Sajovec (57) ABSTRACT

Devices for the manipulation of a suspended particle in an electric field gradient include a plurality of electrically isolated electrodes on a surface. A liquid composition is on the plurality of electrodes. The liquid composition covers the surface continuously between adjacent ones of the plurality of electrodes. The liquid composition has an exposed liquid surface for suspending a particle. The plurality of electrodes are configured to provide an electric field gradient for transporting the particle suspended in said liquid composition.

37 Claims, 6 Drawing Sheets

OTHER PUBLICATIONS

Jones, T.B., "Dielectrophoretic liquid actuation and nanodroplet formation," *Journal of Applied Physics* 89 3 1-8 (Feb. 1, 2001).

Lee et al., "Electrowetting and electrowetting-on-dielectric for microscale liquid handling," *Sensors and Actuators*, 95 259-268 (2002).

Pollack et al., "Electrowetting-based actuation of liquid droplets for microfluidic applications", 77, 11 pp. 1725-1726 (Nov. 11, 2000).

Song et al., "Millisecond kinetics on a microfluidic chip using nanoliters of reagents'" *J. Am. Chem. Soc.* 125, 14613-14619 (2003).

Velev, O.D., "Assembly of latex particles by using emulsion droplets as templates. 1. Microstructured Hollow Spheres," *Langmuir*, 12:10 2374-2384 (1996).

Velev, O.D., Assembly of latex particles by using emulsion droplets as templates 2. Ball-like and composite aggregates *Langmuir*, 12:10 2385-2391 (1996).

Velev, O.D., "Assembly of latex particles by using emulsion droplets 3. reverse (water in oil) system," *Langmuir*, 13:6 1856-1859 (1997).

Velev et al., "A class of microstructured particles through colloidal crystallization," *Science* 287 2240-2243 (2000).

Washizu, Masao, "Electrostatic actuation of liquid droplets for microreactor applications," *IEEE Transactions on Industry Applications* 34 4 732-737 (Jul./Aug. 1998).

Pearson, Helen, "Chemists shrink beakers into drops: Floating droplets could make biosensors" American Chemical Society Meeting, New York, Sep. 2003.

News Release, Researchers Manipulate Tiny, Floating Droplets on a Chip , NC State News Services, Dec. 8, 2003.

Velev, Orlin D. et al, "On-chip manipulation of free droplets, tiny free-floating drops can be driven across a liquid medium by an electric field", Nature, vol. 426, Dec. 4, 2003, pp. 515-516.

Velev, Orlin D. et al, "Electrostatic manipulation of freely suspended droplets for liquid-liquid microfluidics", Submitted to Nature, Jun. 7, 2003.

"Researchers Manipulate Tiny, Floating Droplets on a Chip", Weitere Meldungen im Berich Informationstechologie, Dec. 10, 2003.

\* cited by examiner

DROPLET TRANSPORTATION DEVICES AND METHODS HAVING A FLUID SURFACE

RELATED APPLICATIONS

This application claims priority to U.S. Patent Application No. 60/439,624 filed Jan. 13, 2003, the disclosure of which is incorporated herein by reference in its entirety.

BACKGROUND OF THE INVENTION

1. Field of the Invention

The present invention relates to methods and devices for the transportation of droplets or particles using an electric field gradient.

2. Background

The scaling down of chemical reactions, separations, and analysis processing using microfluidic devices may be useful in various areas of chemical engineering, pharmaceuticals, and biotechnology. Many of the microfluidic devices operate by microchannels inside plastic or glass, which can lead to surface fouling and other problems. The fluids of interest may be in direct contact with the plastic or glass. The liquid inside these channels generally flows in a continuous stream because high capillary pressures generated at any air-liquid boundaries in the microchannels may disrupt operation. Pumping and valving in such small channels may require a significant amount of energy because of high viscous dissipation. Therefore, many of these devices operate as continuous process devices.

Alternatives to continuous streams in microchannels include methods to move a liquid as a micro- or nano-droplet(s) using electric fields or gradients in interfacial tensions. The manipulation of microscopic droplets on a solid surface, however, may be technically difficult. For example, the contact angle hysteresis of the droplets can lead to strong capillary forces, which may increase losses of power and may pin the droplets onto surface contaminants and/or scratches. The open surface of the droplets, combined with the high capillary pressure in the droplets, may lead to rapid evaporation and/or surface fowling. In addition, molecular, particulate, or biological species inside the droplets can become adsorbed on the surface of the solid, which can lead to a loss of the component for which processing is desired, higher contact angle hysteresis and chip contamination that can be difficult to reverse.

The manipulation of microdroplets can also be based on the application of alternating current ("AC") electric fields, called dielectrophoresis ("DEP"). DEP may be used for the manipulation, separation, and collection of cells, viruses, biomolecules and nanoparticles. AC voltages may be used to pull water droplets into a gap between liquid siphons, and similar techniques may be used to move water droplets on solid surfaces. T. B. Jones, M. Gunji, M. Washizu and M. J. Feldman, *J. Appl. Physi.* 89, 14A-F41-14A-F48 (2001) *Dielectrophoretic liquid actuation and nanoddroplet formation.*; T. B. Jones, *Electrostat.* 51, 290-299(2001) *Liquid dielectrophoresis on the microscale.*; M. Washizu, *IEEE T. Ind Applic.* 34, 732-737 (1998). *Electrostatic actuation of liquid droplets for miroreactor applications.*; M. G. Pollack, R. B. Fair, A. D. Shenderov, *Appl. Phys. Lett.* 77, 1725-1726 (2000) *Electrowetting-based actuation of liquid droplets for microfluidic applications*. Parallel electrodes can be used that operate directly on water droplets that are placed on a solid surface. The droplets can be drawn between the electrodes because of the high dielectric permittivity of water. Relatively high voltages and/or high frequencies may be required, which can lead to significant power dissipation, heating of the aqueous phase, and evaporation. In addition, the droplets are generally in direct contact with a solid surface, such as plastic or glass. Thus, many of the problems discussed above with respect to surface fouling, evaporation, chip contamination, etc. may also be present.

SUMMARY OF THE INVENTION

In some embodiments according to the present invention devices are provided for the manipulation of a suspended particle in an electric field gradient. A plurality of electrically isolated electrodes are positioned on a surface. A liquid composition is on the plurality of electrodes. The liquid composition covers the surface continuously between adjacent ones of the plurality of electrodes. The liquid composition has an exposed liquid surface for suspending a particle. The plurality of electrodes are configured to provide an electric field gradient for transporting the particle suspended in said liquid composition.

In this configuration, particles, such as droplets, can be transported without contacting solid surfaces. Surface fouling, evaporation, chip contamination, power dissipation, and heating can be reduced.

Further embodiments according to the present invention provide methods for the manipulation of a suspended particle in an electric field gradient. A plurality of electrodes are configured on a surface to provide an electric field gradient for transporting a particle. A liquid composition is applied on the plurality of electrodes. The liquid composition has an exposed liquid surface for suspending a particle. The particle is suspended in the liquid composition. A voltage is applied between selected ones of the plurality of electrodes to provide the electric field gradient. The electric field gradient defines a pathway for transporting the particle.

DETAILED DESCRIPTION OF THE INVENTION

The present invention now will be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the relative sizes of elements may be exaggerated for clarity. Like reference numerals in the drawings denote like members.

When an element is described as being formed "on" or "adjacent to" another layer or element, the element may be formed directly on the other layer or element, or other elements or layers may be interposed therebetween. In contrast, when an element is referred to as being "directly on" another element, there are no intervening elements present. The thicknesses of elements, layers or regions may be exaggerated for clarity.

Embodiments according to the present invention provide devices and methods for manipulating droplets. With reference to a device 10 shown in FIG. 1A, electrodes 14A-F are positioned in series on a substrate 17. A fluid 16, such as oil, is applied on the electrodes 14A-F, and droplets 12 are suspended in the fluid 16. Electric leads 18 are connected to the electrodes 14A-F and a power source (not shown) to provide a voltage to the electrodes 14A-F. The fluid 16 has an exposed surface 16A that is in open contact with the surrounding air. As illustrated, the droplet 12 is not in contact with any of the solid surfaces of the device 10, such as the solid surfaces of the electrodes 14A-F or the substrate 17. In this configuration, surface fowling, evaporation, adsorption of the droplet 12 (or components carried by the droplet 12), and chip contamination may be reduced.

Figure 1A:
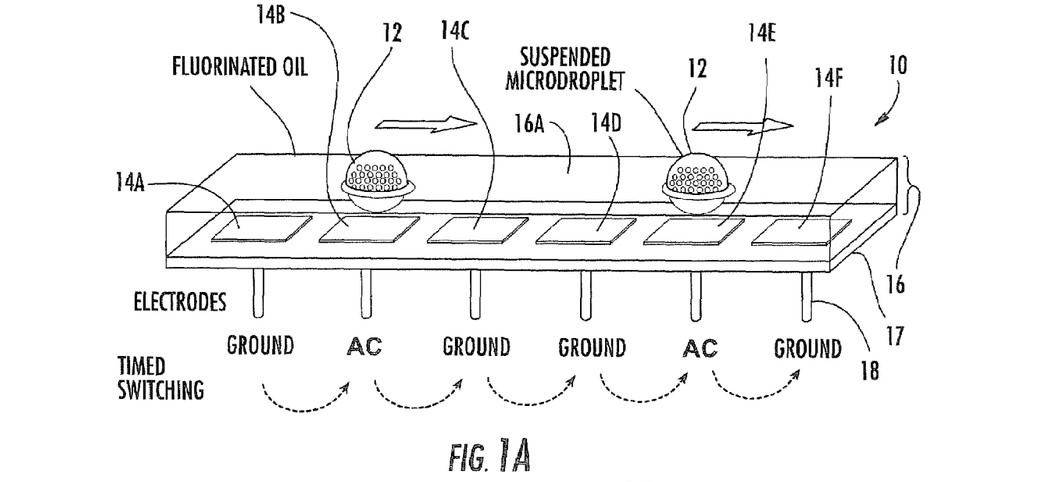
FIG. 1A is a perspective schematic drawing of an electrode series for manipulating droplets on a substrate according to embodiments of the present invention.

Various types of fluids can be used for the fluid 16, such as perfluorinated oil, silicone oil, fluorocarbons, hydrocarbons, and/or combinations thereof. For example, perfluorinated hydrocarbons, or other inert, benign liquids with a low dielectric permittivity that is denser than water, can be used. The droplets 12 can be water droplets or hydrocarbon droplets. In some embodiments, the fluid 16 can be a hydrocarbon fluid and the droplets 12 can be formed of a perfluorinated oil suspended therein, i.e., an oil/oil suspension. The substrate 17 can be any solid material, and the substrate 17 does not require any particular surface treatment with respect to smoothness, wetting, etc. Although embodiments of the present invention are described herein with reference to droplets, it should be understood that solid particles can also be suspended in a fluid surface (e.g., fluid 16). Solid particles can result from precipitations of liquid droplets on the fluid surface, or solid particles can be deposited directly on the fluid surface. Liquid droplets of various viscosities can also be transported on a fluid surface. Moreover, the droplets can include other components, such as nanoparticles, microparticles, surfactants, protein, cells, viruses, polymers, polymerizable monomers, surfactants, silicone compounds, and/or combinations thereof. Such components can be included in the droplets 12 in any form by which the component can be carried, such as in solutions, suspensions, dispersions, microemulsions, emulsions, etc. The droplets 12 can be between about 0.01 µL and about 10 µL.

As shown in FIG. 1, the suspended droplets 12 can be driven by alternating currents (AC) and/or direct currents (DC) applied to the electrodes 14A-F. Alternating current can be provided at between about 50V and about 500 V at a frequency between about 50 Hz and about 500 Hz. Exemplary ranges of DC voltages are between about 20 V And about 500V. The electrodes 14A-F are arranged in series and are electrically isolated from one another by the substrate 17. The electric field patterns created by the electrodes 14A-F allow controlled droplet motion along predetermined pathways. The electrodes 14A-F can be individually addressable by a controller, and typically, the electrodes 14A-F that are not switched to the high voltage source are grounded.

As described in more detail below, movement of multiple droplets can be controlled using electrodes, such as the electrodes 14A-F in FIG. 1A, that provide an electric field gradient along one or more pathways. In some embodiments, the electrodes can be configured to provide two or more pathways that may intersect to combine droplets. Droplets can be combined on a single pathway by transporting droplets in opposite directions or in arbitrary directions on electrode arrays. Combined droplets can be used to provide various types of microassays, including assays known to those of skill in the art. For example, bioassays can be provided, which include microsphere agglutination or fluorescence assays for proteins DNA, RNA, viruses or other biologically specific markers. As another example, viability assays can be used to detect the viability status of cells, bacteria or viruses in droplets by mixing a droplet containing the cell, bacteria, or virus of interest with a droplet containing a toxin, virus, protein, or other disease-causing agent. Drug screening microassays may involve determining the viability status of cells, bacteria or viruses after mixing a droplet containing the cell, bacteria, or virus with a droplet(s) containing the drug and/or a disease-causing agent. Chemical microassays can be performed such that the status of a certain chemical reaction is expressed by a change in color, precipitation, opalescence, or fluorescence after two droplets are mixed. Assays according to embodiments of the present invention can be used to detect toxins, chemical agents, environmental contaminants, detergency actions, etc. Mixing, drying or polymerization reactions can lead to the synthesis of advanced materials in the form of anisotropic or otherwise organized particles. Examples of such preparation and application of droplets and/or particles are given in O. D. Velev, K Furusawa, K. Nagayama, *Langmuir* 12, 2374 (1996); O. D. Velev and K. Nagayama, *Langmuir* 13, 1856 (1997); O. D. Velev, A. M. Lenhoff, E. W. Kaler, *Science* 287, 2240-2243 (2000), the disclosures of which are hereby incorporated by reference in their entireties.

Electrodes according to embodiments of the present invention can be configured in various shapes and positioned in various arrays to provide a desired electric field to manipulate motion of a droplet. Without wishing to be bound by any particular theory, in some embodiments, the application of a spatially inhomogeneous AC on electrodes can provide a dielectrophoretic (DEP) force, $F_{DEP}$, which acts in the direction of the gradient of the squared electric field, $\Delta E^2$, and which can be described by the following equation.

$$\vec{F}_{DEP} = 2\pi\epsilon_1 Re\{\underline{K(w)}\}r^3\Delta E^2$$

where r is the radius of the particle (e.g., the droplet 12 in FIG. 1A), $\epsilon_1$ is the dielectric permittivity of the media (e.g., the fluid 16), and K is the Clausius-Mossotti factor. The direction and magnitude of the DEP force depend on the real part of K, which in the example given in FIG. 1A is the effective polarizability of the droplet 12 and is generally higher than droplets in a continuous liquid media, such as in microchannel devices. The droplets 12 can also be attracted and repelled by constant DC fields applied to the electrodes 14A-f The forces operating in this case include common electrostatic (Coulombic) attraction and repulsion. These forces are possible because the droplets posses charge, and/or dipole moment.

Figure 1B:
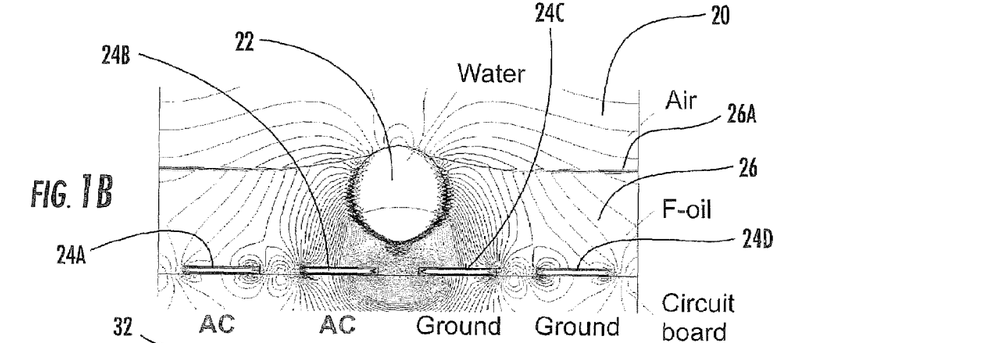
FIGS. 1B-1C are side views of electric fields with gradients produced by electrodes submerged in a fluid having a droplet suspended therein according to embodiments of the present invention.
Figure 1C:
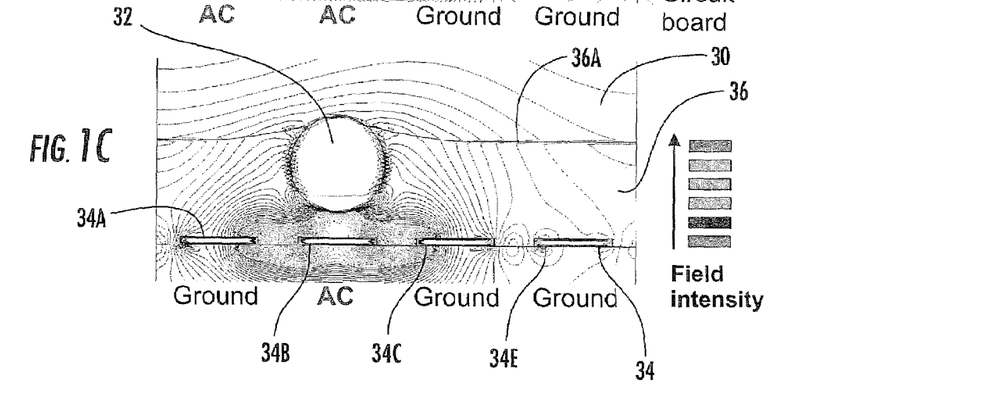

The equilibrium position of one of the droplets 12 with respect to the electrodes depend on the pattern and/or frequency of the voltage on the electrodes 14A-F. As shown in FIG. 1A, electrodes 14A, 14C, 14D, and 14F are grounded, and electrodes 14B and 14E are provided with AC power. Further examples of electrodes and electrode field gradients are shown in FIGS. 1B-1C, in which electrodes 24A-24D, 34A-34D are submerged in fluids 26, 36, respectively. The fluids 26, 36 each have an exposed surface 26A, 36A in contact with surrounding air 20, 30. Droplets 22, 32 are suspended in the fluids 26, 36 and manipulated by the electric field gradients provided by the electrodes 24A-24D, 34A-34D. Electrodes 24C, 24D, 34A, 34C, and 34E are grounded, and electrodes 24A, 24B, and 34B are connected to an AC power source. In FIGS. 1A-C, the droplets 12, 22, 32 can be water droplets and the fluids 16, 26, 36 can be perfluorinated hydrocarbon oil (F-oil). Water droplets can be attracted along the electric field gradient produced by the electrodes 14A-F, 24A-D, 34A-D to regions of high field intensities because water droplets have a higher dielectric permittivity and conductance than F-oil.

For example, as shown in FIG. 1B, the electrodes 24A-24D are connected in sequences of two energized electrodes 24A, 24B and two grounded electrodes 24C, 24D. The droplet 22 migrates to the gap between the energized electrodes 24A, 24B and the non-energized electrodes 24C, 24D because the droplet position at this gap is in close proximity to the area of highest field intensity. On the other hand, if a single energized electrode is positioned between grounded electrodes, the electric field gradients can position the droplet substantially above the energized electrodes. As shown in FIG. 1A, the droplets 12 are positioned above the energized electrodes 14B, 14E, and in FIG. 1C, the droplet 32 is positioned above the energized electrode 34B. The trapped droplets 12, 32 can be moved by consecutively switching on and off the voltage to the various electrodes 14A-14F, 34A-34D.

Figure 1D:
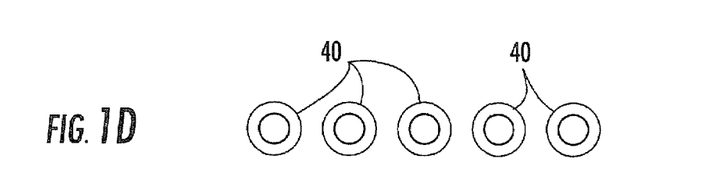
FIGS. 1D-1H are top views of electrode configurations according to embodiments of the present invention.
Figure 1E:
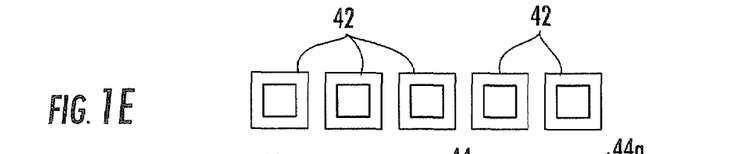
Figure 1F:
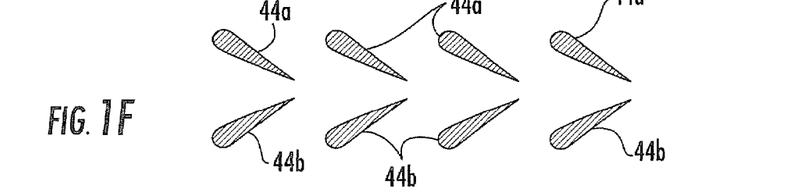
Figure 1G:
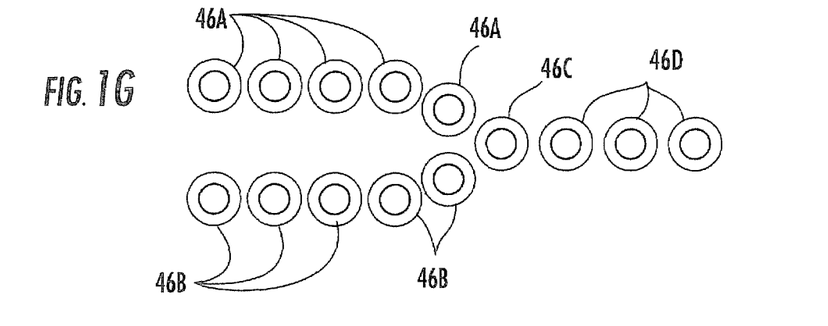
Figure 1H:
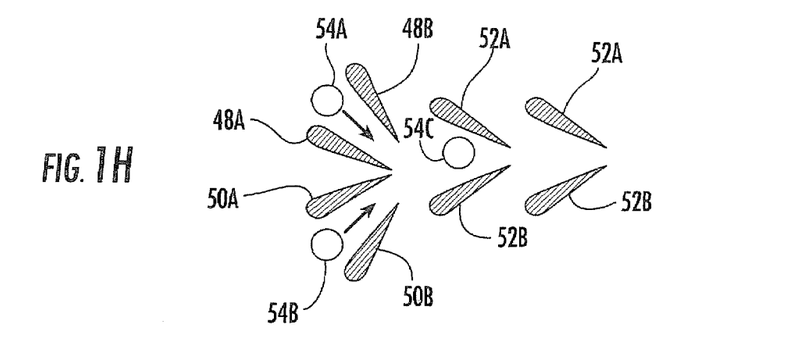

Electrodes according to embodiments of the present invention can be shaped in various configurations. For example, the electrodes can be conductive rings having an interior void, such as the circular ring electrodes 40 shown in FIG. 1D or the square ring electrodes 42 shown in FIG. 1E. Pairs of electrodes can also be used to provide a desired electric field gradient, such as the "herringbone" configuration of electrode pairs 44A, 44B shown in FIG. 1F. The electrodes can be arranged in an array to provide pathways along which a droplet can be transported. For example, in FIG. 1G, electrodes 46A define one pathway and electrodes 46B define another pathway. Electrodes 46D define still another pathway. The electrode pathways intersect at electrode 46C. The configuration shown in FIG. 1G can be used to combine or divide one or more droplets. For example, droplets transported along electrodes 46A from left to right and droplets transported along electrodes 46B from left to right can be combined with one another at the intersection electrode 46C. On the other hand, the voltages applied to the electrodes 46A-D can be selected such that droplets can be transported along electrodes 46 from right to left and separated into two droplets at intersection electrode 46C. One of the resulting droplets is transported away from electrode 46C along electrodes 46A, and the other droplet is transported away from electrode 46C along electrodes 46B. As another example of an electrode configuration that can be used to combine droplets with reference to FIG. H, electrode pairs 48A, 48B, 50A, 50B, 52A, 52B can be used to combine one droplet 54A from electrode pair 48A, 48B with another droplet 54B from electrode pair 50A, 50B. The combined droplet 54C can be further transported by an additional electrode pair 52A, 52B. The electrodes can also be combined in a two-dimensional array so that a droplet can be moved in horizontal, vertical, or diagonal directions, depending on which of the surrounding electrodes are energized by the controller.

In some embodiments, the electrodes described in the examples above can have a length of between about 0.1 and about 1 mm and a distance between electrodes in a given array of between about 0.1 mm and about 1 mm.

The following non-limiting examples are provided to illustrate various embodiments according to the present invention in detail.

EXAMPLE 1

Fluid-Fluid Droplet Transport Devices

Figure 4:
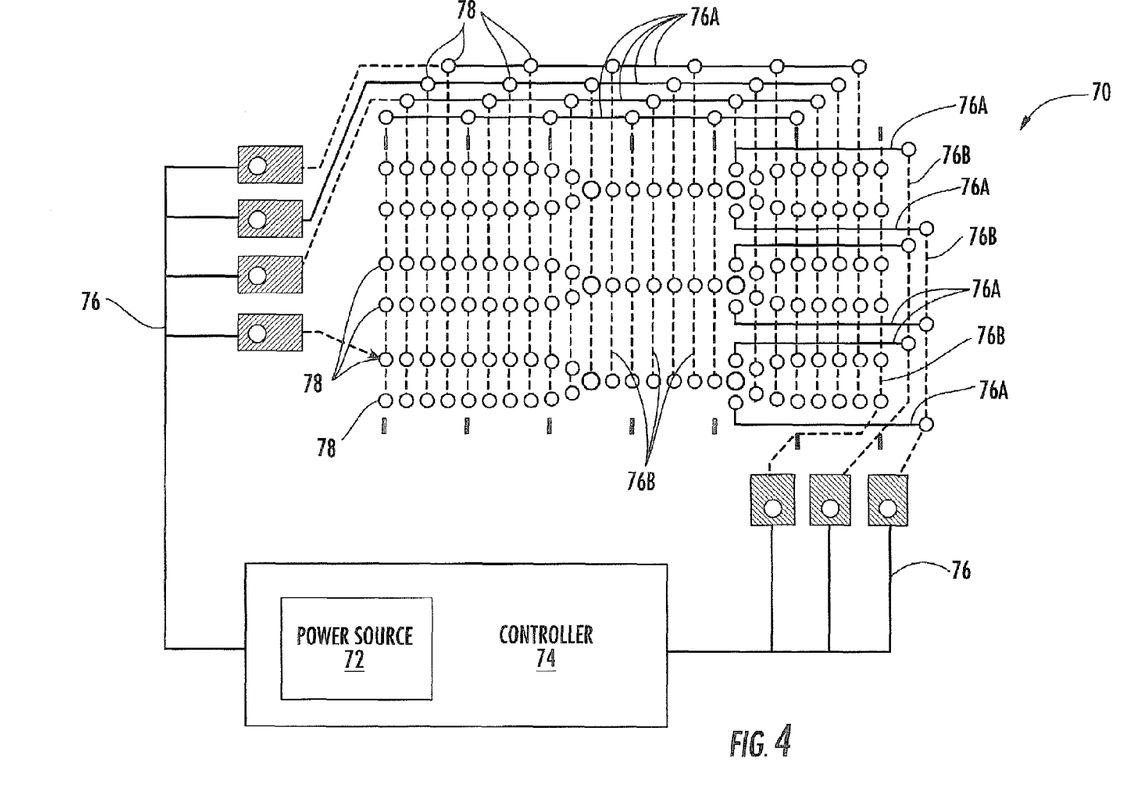
FIG. 4 is a schematic drawing of an examplary design of electrodes and their connecting leads in a fluid-fluid chip according to embodiments of the present invention.

Electrodes and electrical leads were fabricated on two-sided printed circuit boards that have electrodes on one side and connecting leads on the other. An exemplary device 70 is shown in FIG. 4. An array of electrodes 78 is arranged on a circuit board substrate (not shown). The electrodes 78 are connected to a controller 74 by leads 76, 76A, 76B. As illustrated, the leads 76A pass above the circuit board and leads 76B (dashed lines) pass below the circuit board. A controller 74 that includes a power source 72 controls power to the electrodes 78. The power source 72 can be an AC and/or a DC power source. The controller 74 can also include a computer controlled switch box, and amplifier, and/or a signal generator for controlling the signals to the electrodes 78.

The electrode boards were immersed inside 50 mm Petri dishes filed with perfloromethyldecaline (PFMD). The electrode leads were connected through a computer controlled switch box to an amplifier a signal generator. Electrodes that were not switched to a high voltage amplifier output were grounded. The transition between AC to DC signals could be made gradually be varying the symmetry ratio of the AC waves, from full negative, to symmetric AC, to full positive voltage. Some droplets were formed from aqueous suspensions of polystyrene latex microspheres that were purchased from Interfacial Dynamics Corp. (OR). Other droplets contained gold nanoparticle suspensions that were synthesized by citrate reduction of auric acid in the presence of tannic acid.

As shown in FIGS. 2A-D and 3A-D, droplets were suspended in the PFMD oil of a device as describe above and transported by AC and/or DC currents applied to the arrays of individually addressable electrodes. The droplets included water or dodecane droplets having a volume of about 500-100 nL, which were formed by micropipette and suspended at the oil/air interface without contact with the electrodes. Some of the water droplets used contained suspensions of micro- and nanoparticles as described above. The droplets were driven with AC or DC voltages in the range of 200-600 V. The AC frequencies were in the rang of 50-5000 Hz.

Figure 2A:
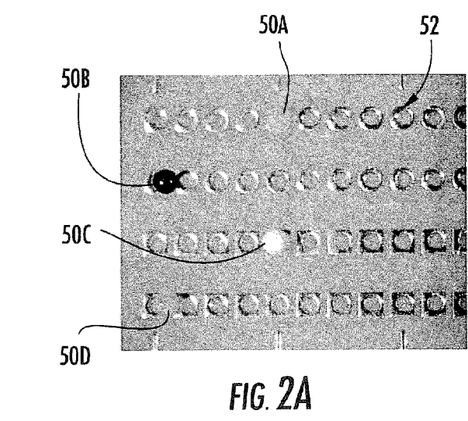
FIGS. 2A-2B are top views of equilibrium positions of 750 nL droplets on an electrode array according to embodiments of the present invention.
Figure 2B:
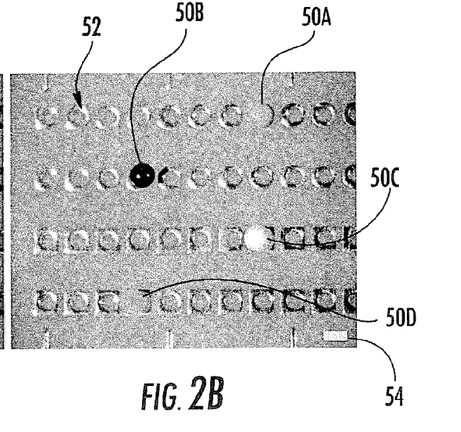

FIG. 2A illustrates the initial equilibrium positions of four droplets 50A-D on an array of electrodes 52. Every fourth electrode beginning from the left side of the picture is energized. The droplets 50A-D contain fluorescent latex microparticles (droplet 50A), gold nanoparticles (droplet 50B), white latex (droplet 50C), and magnetic latex (droplet 50D). FIG. 2B illustrates another position of the droplets after three cycles of switching the electrodes 52 to the right. The scale bar 54 is 1 mm.

As illustrated, multiple droplets containing different nanoparticles (or other components), can be transported on chips with a large number of individually addressable electrodes. The droplets can be directed along the desired track by switching electrodes, and electric field gradients can be configured to combine or separate the droplets. The two-dimensional matrixes of individually addressable electrodes can allow independent positioning, movement in a desired direction, mixing of droplets of various compositions, and/or the separation of a droplet into two droplets.

EXAMPLE 2

Parameter Effects

Figure 2C:
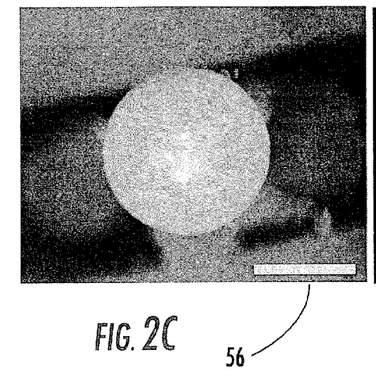
FIG. 2C is a colloidal crystal formed on the upper surface of a droplet according to embodiments of the present invention.
Figure 2D:
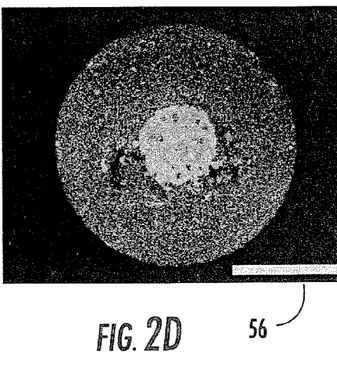
FIG. 2D is a confocal microscopy three-dimensional reconstruction of a droplet containing 0.2 wt. % fluorescent latex where nearly all of the particles are concentrated on the droplet top surface according to embodiments of the present invention.

The effects of basic system parameters on droplet mobility in the devices described in Example 1 are summarized in Table 1 below.

trated to the point of colloidal crystallization. FIG. 2C illustrates colloidal crystals formed on the upper surface of a droplet containing 20 wt. % of sulfate latex. The droplet is suspended in oil, and the upper surface of the droplet is exposed to air above the oil/air interface. The particles have crystallized because of attraction to the top surface. FIG. 2D is a confocal microscopy three-dimensional reconstruction from above the droplet in FIG. 2C illustrating that nearly all of the particles are concentrated at the top surface. The scale bar 56 is 500 μm.

The asymmetric dielectric environment can provide this polarization of particle distribution. In contrast, when a thick layer of dodecane was poured on top of the perfluorinated hydrocarbon oil so that the droplets were immersed in a media with uniform dielectric constant, the particles remained essentially uniformly dispersed. The concentration of particles at the upper surface of a droplet may be used in droplets that are carriers for micro- and nanoparticles and living cells because it allows their contents to be thus separated and clearly visible on the top side of the droplet.

EXAMPLE 4

Droplet Mixing

Figures 3A, 3B:
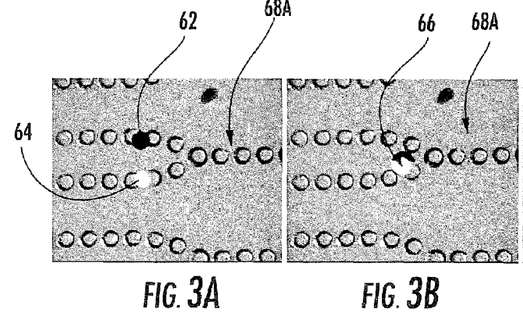
FIGS. 3A-C are top views of two droplets (FIG. 3A) that are combined and mixed (FIGS. 3B-C) on a fluid-fluid electrode chip according to embodiments of the present invention.
Figure 3C:
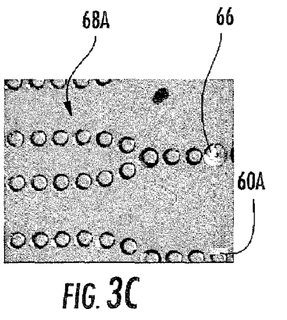

FIGS. 3A-C illustrate the mixing, precipitation, and encapsulation in aqueous microdroplets suspended on a matrix fluidic chip. An electrode array 68A is submerged in oil as described in Example 1. A droplet 62 containing magnetic latex and a droplet 64 containing polystyrene are suspended in the oil in FIG. 3A. As shown in FIG. 3A, the droplets 62, 64

TABLE 1

Effect of the experimental parameters on the responsiveness and mobility of the suspended microdroplets.

| Factor | Range studied | Effect on droplet responsiveness |
|---|---|---|
| AC field | Symmetric square waves | Moves water droplets towards areas of highest field intensity (FIG. 1A-B). |
| DC bias | 0-500 V | Attraction or repulsion, followed by recharging. Moves both water and oil droplets. Very strong, but erratic. |
| AC amplitude | 0-600 V | Increases (↑) proportionally to $E^2$ |
| AC frequency | 50-5000 Hz | None |
| Droplet volume | 500-1500 nL | ↑ |
| Distance between droplet bottom and chip surface | 0.01–0.5 mm | Decreases (↓) |
| Electrolyte in water droplets | None added - 0.1 M | (↑) Small |
| Fluorinated or non-fluorinated surfactant added in droplet | 0-0.1 wt. % | None |
| Full immersion of the droplets in overlying dodecane layer | — | ↓↓ Could lead to complete loss of responsiveness |
| Electrode geometry | Square or circular | Square electrodes more effective at shorter drop-electrode distance, circular at larger |

EXAMPLE 3

Particle Crystallization

Internal polarization of droplets, such as the droplets described in Example 1, may be evidenced by observing the vertical distribution of particles contained inside the droplets. Negatively charged latex microparticles inside a droplet can migrate and accumulate on the side of the droplet cap that protrudes above the fluid in which the droplet is suspended. Color diffraction from the concentrated particle phase directly below the droplet surface may be observed, which may indicate that the particles on top can become concenare transported along two respective pathways and combined at an intersection between the pathways to form a combined droplet 66. The combined droplet 66 can be further transported as shown in FIG. 3C.

Figure 3D:
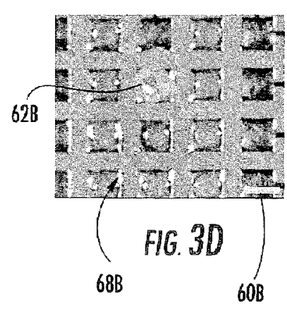
FIG. 3D is a micrograph of the combined droplet that results after two droplets containing polystyrene (white) and magnetic (brown) latex have been mixed to temporarily form anisotropic polymer aggregate according to embodiments of the present invention.

A two-dimensional matrix electrode array 68B having a droplet 62B thereon is shown in FIG. 3D. The electrodes of the two-dimensional matrix array 68B are spaced such that a droplet can be moved vertically, horizontally, and/or diagonally. The electrode array 68B has been submerged in oil as described in Example 1. As illustrated, the droplet 62B is the result of a combination of a droplet containing polystyrene (white) and another droplet containing magnetic (brown) to temporarily form an aniosotropic polymer aggregate. That is, when particles carried inside droplets were allowed to segregate to the top of the droplet prior to mixing, intermittent anisotropic clusters of particles formed on the surface of the newly combined particle 62B, as shown in FIG. 3D. Because fluidic chips according to embodiments of the invention can provide massive parallelization, such chips can be used for automated fabrication of functional micro- and nano-assemblies, such as "supraparticles" with colloidal crystal structure. The scale bar 60A is 1 mm.

EXAMPLE 5

Droplet Mixing and Precipitation

Figure 3E:
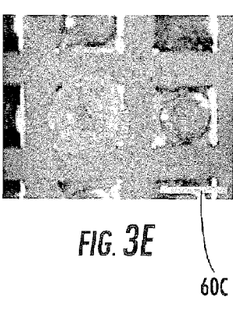
FIG. 3E is a micrograph of a crystalline shell of calcium phosphate precipitated after mixing droplets containing solutions of $Na_2HPO_4$ and $CaCl_2$.

A variety of mixing and precipitation experiments were performed by controllably merging pairs of droplets of different compositions, such as those described with respect to FIGS. 3A-D on a chip as described in Example 1. The complex precipitation patters inside the mixed droplets can lead to the formation of crystal shell-like balls. These particles have a water core inside and could be further moved intact along the electrodes. Such shell-like crystalline particles may be used, e.g., as biomimetic capsules. FIG. 3E shows a crystalline shell of calcium phosphate precipitated after mixing droplets containing solutions of $Na_2HPO_4$ and $CaCl_2$. The scale bar 60B is 1 mm.

Figure 3F:
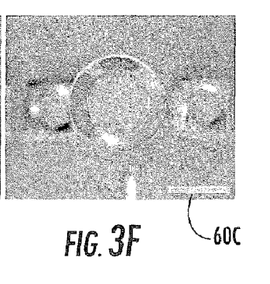
FIG. 3F is a micrograph of a water droplet containing 1.0 wt. % latex and 1.9 nM Na-dodecyl sulfate encapsulated inside a liquid dodecane shell.

Water and hydrocarbon droplets on the chips were combined in a 1:1 ratio. The droplets can be mixed as described with respect to droplets 62, 64 in FIGS. 3A-C. When a surfactant, such as sodium dodecyl sulfate, was added to the water droplets, the interfacial tensions balance can favor the complete engulfment of the water droplet in the hydrocarbon droplet. The water droplets became symmetrically encapsulated inside a liquid hydrocarbon shell. FIG. 3F illustrates a water droplet containing 1.0 wt. % latex and 1.9 mM Na-dodecyl sulfate encapsulated inside a liquid dodecane shell. The scale bar 60C is 1 mm.

EXAMPLE 6

Power Dissipation

The devices and methods described in Examples 1-5 were used to transport various droplets using various electrode patterns. The maximum speed at which droplets can be moved by switching AC power to the electrodes may be approximately proportional to $E^2$, as provided by the above formula for $F_{DEP}$, which was verified experimentally. Power dissipation (also verified experimentally) may be relatively low because the currents through the electrode may be smaller than the capacitance leaks in the circuit. It has been estimated that the energy needed to transport a suspended droplet in some embodiments of the invention can be on the order of $1 \times 10^{-9}$ J/cm for droplets having a volume of between about 500 and 1000 nL. In contrast, the energy required to move a similar droplet size on a solid surface or in microfluidic channels may be two orders of magnitude greater.

A liquid-liquid microfluidic chip as described in Example 1 was prepared. An estimate for the energy required to move a 500 nL water droplet 1 cm at 2 mm/s using the chip as described in Example 1 is compared to estimates for energies for transporting similar droplets by conventional microfluidics with channels in Table 2.

TABLE 2

|  | Droplet moved in F-oil | Hemispherical droplet dragged on solid surface | Viscous flow in microfluidic channel |
|---|---|---|---|
| Assumptions and approximations | Stokes sphere in bulk liquid | $\theta_{Advancing}$ = 90 deg<br>$\theta_{Receding}$ = 80 deg<br>No viscous dissipation | Circular channel of diameter 20 μm<br>Poiseuille flow |
| Type of estimation | Overestimate | Underestimate | Underestimate |
| Energy required/J | $\leq 9.4 \times 10^{-10}$ | $\geq 1.6 \times 10^{-7}$ | $\geq 1.4 \times 10^{-4}$ |
| Energy ratio | 1 | 170 | 150000 |

EXAMPLE 7

Electric Fields and Energy

Various electric fields can be provided to obtain the desired movement of droplets. For example, AC power can be used as discussed above or droplets can also be transported using a DC power source to provide constant electrical voltages. Water droplets may respond strongly to DC fields by either moving rapidly away from an energized DC electrode, or by being strongly attracted towards it. The velocity of droplet motion and the range of the interactions may be larger than the AC-driven effects at the same voltage range. For example, the velocity can be twice as large and reach speeds of 2.0 mm/s or higher. This speed may be due to the water droplets having a significant charge and/or dipole moments that respond to Coulombic repulsion or attraction. The sign of the charge of a droplet made from various suspensions can vary from positive to negative. The droplets may be charged by collecting static charges from the interface of the fluid in which the droplet is suspended and/or from a charge transfer through the fluid phase. Furthermore, charging and/or re-charging effects may be observed at combined AC+DC voltages. The use of DC fields can be used to manipulate other droplets, such as hydrocarbon oil droplets. These droplets may not respond to symmetric AC fields due to a lack of polarizability because their dielectric permittivity is close to that of PFMD. However, hydrocarbon oil droplets may respond to a constant field in a manner similar to water droplets.

EXAMPLE 8

Droplet Velocity

Figure 5:
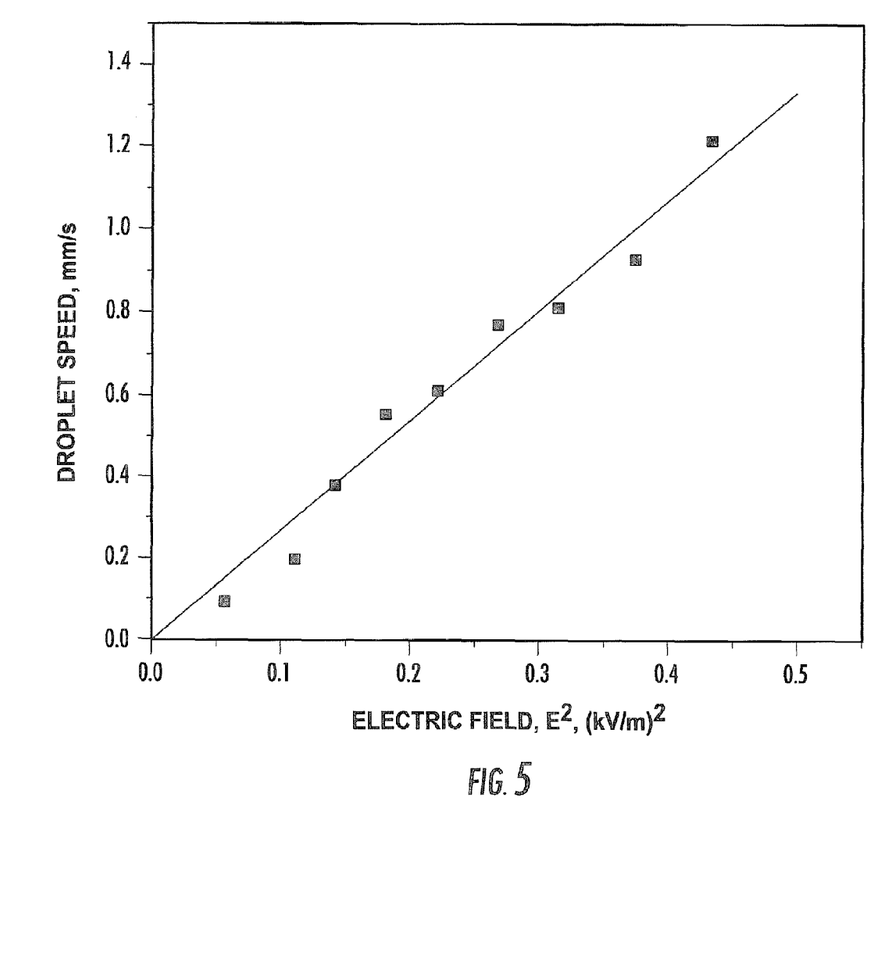
FIG. 5 is a graph of the droplet speed as a function of the squared field intensity for 750 nL aqueous droplets submersed in a 1.15 mm deep PFMD layer according to embodiments of the present invention.

The speed of a droplet placed on devices described in Example 1 was measured. The droplet was a 750 nL aqueous droplet submersed in a 1.15 mm deep PFMD layer. The speed was measured by the shortest time required for the droplet to traverse an automated eight electrode sequence in a forwards and backwards direction. The field was estimated by dividing the voltage applied by the electrode pitch, which was 1.54 mm. The AC frequency was 200 Hz. The droplet speed as a function of the field intensity squared is shown in FIG. 5.

Embodiments of the present invention described herein can be combined with existing electrowetting and channel microfluidics techniques in larger integrated devices. This can be used for automatic droplet dispensing onto the fluorinated oil surface. For example, the existing techniques for droplet breakup and manipulation by electrowetting on solid surfaces [see, e.g., T. B. Jones, M. Gunji, M. Washizu and M. J. Feldman, *J Appl. Physi.* 89, 14A-F41-14A-F48 (2001) *Dielectrophoretic liquid actuation and nanodroplet formation.*] could be used to break up droplets from a larger volume of liquid at the edge of the chip. This can automate the procedure of droplet deposition on the surface of the liquid, which may also be done by a micropipette. Droplets can then be further manipulated as described herein. Similarly, common microfluidic channels can be used for liquid transport to a chip and droplet breakup. The removal of droplets from liquid surfaces and their collection and/or disposal can also be performed by using electrowetting or microfluidic channels.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A device for the manipulation of a suspended particle in an electric field gradient comprising:
    a plurality of electrically isolated electrodes on a surface; and
    a liquid composition on said plurality of electrodes, said liquid composition covering said surface continuously between adjacent ones of said plurality of electrodes, said liquid composition having an exposed liquid surface defining a liquid/air interface for suspending a particle;
    said plurality of electrodes configured to provide an electric field gradient for transporting the particle suspended in said liquid composition at said liquid/air interface; and
    a particle suspended in said liquid composition at said liquid/air interface, wherein said particle is spaced apart from said plurality of electrodes.

2. The device of claim 1, wherein said liquid composition is selected from the group consisting of perfluorinated oil, silicone oil, fluorocarbons, hydrocarbons, and/or chemical and/or physical combinations thereof.

3. The device of claim 1, wherein said particle comprises a solid particle.

4. The device of claim 1, wherein said particle comprises a fluid droplet.

5. The device of claim 4, wherein said fluid droplet includes a carried component suspended, dissolved, or solubilized therein.

6. The device of claim 5, wherein said fluid droplet comprises water and said carried component is selected from the group consisting of nanoparticles, microparticles, surfactants, proteins, cells, viruses, drugs, toxins, chemical compounds, or combinations thereof.

7. The device of claim 5, wherein said fluid droplet comprises hydrocarbon or an organic compound and said carried component is selected from the group consisting of nanoparticles, microparticles, polymers, polymerizable monomers, surfactants, silicone compounds, and/or combinations thereof.

8. The device of claim 4, wherein said fluid droplet has a volume between about 0.01 µL and about 10 µL.

9. The device of claim 1, wherein said plurality of electrodes are configured to provide a first pathway for a first particle and a second pathway for a second particle, said first pathway and said second pathway having an intersection for combining said first particle and said second particle.

10. The device of claim 1, wherein ones of said plurality of electrodes comprises a conductive ring.

11. The device of claim 1, wherein said plurality of electrodes are configured in a two-dimensional matrix.

12. The device of claim 1, wherein said surface includes a first side having said plurality of electrodes positioned thereon, and a second side having a plurality of leads electrically connected to said plurality of electrodes, ones of the plurality of leads being connected to an alternating current source, a direct current source or ground, wherein the positions of said plurality of electrodes are selected to provide a dynamic non-uniform electric field pattern for transporting a particle along a pathway.

13. The device of claim 1, wherein said plurality of electrodes have a length of between about 0.1 and about 1 mm and a distance between adjacent ones of said plurality of electrodes between about 0.1 mm and about 1 mm.

14. The device of claim 1, further comprising a power source connected to said plurality of electrodes, said power source configured to provide an alternating current (AC) voltage of between about 50 V and about 500 V at a frequency between about 50 Hz and about 500 Hz to ones of said plurality of electrodes.

15. The device of claim 1, further comprising a power source connected to said plurality of electrodes, said power source configured to provide a direct current (DC) voltage between about 20 and about 500 V to ones of said plurality of electrodes.

16. The device of claim 1, wherein said plurality of electrodes are configured to provide an electric field gradient for applying force to a droplet suspended in the liquid fluid in opposing directions for separating the droplet into two droplets.

17. The device of claim 1, wherein the particle is suspended in said liquid composition at the liquid/air interface such that a portion of the particle contacts the liquid composition and another portion of the particle contacts air at the liquid/air interface.

18. A method for the manipulation of a suspended particle in an electric field gradient comprising:
    configuring a plurality of electrodes on a surface to provide an electric field gradient for transporting a particle;
    applying a liquid composition on the plurality of electrodes, the liquid composition having an exposed liquid surface defining a liquid/air interface for suspending a particle;
    suspending the particle in the liquid composition at said liquid/air interface;
    applying a voltage between selected ones of the plurality of electrodes to provide the electric field gradient, the electric field gradient having a pattern that defines a pathway for transporting the particle at said liquid/air interface; and
    transporting the particle along the pathway defined by the electric field gradient at said liquid/air interface, wherein the particle is spaced apart from the plurality of electrodes.

19. The method of claim 18, wherein the liquid composition is selected from the group consisting of perfluorinated oil, silicone oil, fluorocarbons, hydrocarbons, and/or chemical and/or physical combinations thereof.

20. The method of claim 18, wherein the particle comprises a solid particle.

21. The method of claim 18, wherein the particle comprises a fluid droplet.

22. The method of claim 21, wherein the fluid droplet further comprises a carried component suspended, dissolved, or solubized therein.

23. The method of claim 22, wherein the fluid droplet comprises water and the carried component is selected from the group consisting of nanoparticles, microparticles, surfactants, proteins, cells, viruses, drugs, toxins, chemical compounds, or combinations thereof.

24. The method of claim 22, wherein the fluid droplet comprises hydrocarbon or an organic material and the carried component is selected from the group consisting of a nanoparticle, a microparticle, a polymer, a polymerizable monomer, a surfactant, a silicone compound, and/or combinations thereof.

25. The method of claim 22, wherein the fluid droplet has a volume between about 0.01 μL and about 10 μL.

26. The method of claim 18, wherein the pattern of the electric field gradient further defines a second pathway, the first pathway and the second pathway having a common intersection, the method comprising:
    transporting a second particle along the second pathway; and
    combining the first particle and the second particle at the intersection between the first pathway and the second pathway.

27. The method of claim 26, wherein the first droplet and the second droplet comprise constituents of an assay.

28. The method of claim 26, further comprising chemically reacting constituents of the first droplet with constituents of the second droplet.

29. The method of claim 26, wherein said combining step further comprises forming a solid and/or encapsulated particulate product.

30. The method of claim 18, wherein ones of the plurality of electrodes comprises a conductive ring.

31. The method of claim 18, further comprising configuring said plurality of electrodes in a two-dimensional matrix.

32. The method of claim 18, wherein the surface includes a first side having the plurality of electrodes positioned thereon, and a second side having a plurality of leads electrically connected to the plurality of electrodes, further comprising:
    connecting ones of the plurality of leads to an alternating current source, a direct current source or ground; and
    selecting the positions of the plurality of electrodes to provide a dynamic non-uniform electric field pattern for transporting the particle along the pathway.

33. The method of claim 18, wherein ones of the plurality of electrodes have a length of between about 0.1 and about 1 mm and the distance between electrodes ranges from between about 0.1 mm to about 1 mm.

34. The method of claim 18, further comprising applying an alternating current (AC) voltage of between about 50 V and about 500 V at a frequency between about 50 Hz and about 500 Hz to ones of the plurality of electrodes.

35. The method of claim 18, further comprising applying a direct current (DC) voltage between about 20 and about 500 V to ones of the plurality of electrodes.

36. The method of claim 18, further comprising:
    providing an electric field gradient that applies force to a droplet suspended in the liquid fluid in two directions; and
    separating the droplet into two droplets by applying the electric field gradient.

37. The method of claim 18, wherein the particle is suspended in said liquid composition at the liquid/air interface such that a portion of the particle contacts the liquid composition and another portion of the particle contacts air at the liquid/air interface.

* * * * *